(12) United States Patent
Diewald et al.

(10) Patent No.: US 6,528,454 B1
(45) Date of Patent: Mar. 4, 2003

(54) CATALYST CARRIER BODY WITH EXPOSED HEAT-RADIATING SURFACES

(75) Inventors: Robert Diewald, Siegburg (DE); Rolf Brück, Bergisch Gladbach (DE)

(73) Assignee: Emitec Gesellschaft für Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/566,932

(22) Filed: May 8, 2000

Related U.S. Application Data

(63) Continuation of application No. PCT/EP98/07048, filed on Nov. 4, 1998.

(30) Foreign Application Priority Data

Nov. 7, 1997 (DE) ......................................... 197 49 379

(51) Int. Cl.$^7$ ................................................. B01J 21/04
(52) U.S. Cl. .............. 502/439; 502/527.23; 502/527.24
(58) Field of Search ........................... 502/439, 527.18, 502/527.19, 527.24, 527.22, 527.23; 422/211; 428/116

(56) References Cited

U.S. PATENT DOCUMENTS

| | | | |
|---|---|---|---|
| 2,552,615 A | | 5/1951 | Baltzer |
| 5,374,402 A | * | 12/1994 | Hitachi et al. ............... 422/117 |
| 5,494,881 A | * | 2/1996 | Machida et al. ............ 502/439 |
| 5,506,028 A | * | 4/1996 | Bruck ........................ 428/116 |
| 5,518,697 A | * | 5/1996 | Dalla Betta et al. ........ 422/173 |

FOREIGN PATENT DOCUMENTS

| | | |
|---|---|---|
| DE | 29 05 241 | 8/1980 |
| EP | 0 121 175 | 1/1987 |
| EP | 0 245 738 | 11/1987 |

OTHER PUBLICATIONS

Japanese Patent Abstract No. 62–149346 (Horiuchi), dated Jul. 3, 1987.

\* cited by examiner

*Primary Examiner*—Stanley S. Silverman
*Assistant Examiner*—Edward M. Johnson
(74) *Attorney, Agent, or Firm*—Laurence A. Greenberg; Werner H. Stemer; Gregory L. Mayback

(57) ABSTRACT

A catalyst carrier body for an exhaust system of an internal combustion engine, especially of a motor vehicle, includes a matrix having an inflow surface, an outflow surface, a periphery, and a multiplicity of catalytic surfaces around which exhaust gas can flow. The catalytic surfaces have front regions and form flow-through passages. The outflow surface has a shape, at least in an inner region thereof, causing the front regions to be exposed and not covered outwardly, toward the periphery, by others of the catalytic surfaces. The exposed front regions have lengths, at least in a partial region of the outflow surface, amounting to from 55% to 90% of the length of the flow-through passages, for increasing an outward dissipation of heat. As a result, outwardly open heat radiating areas are guaranteed for an improved emission of heat to the surroundings or into the exhaust system.

22 Claims, 2 Drawing Sheets

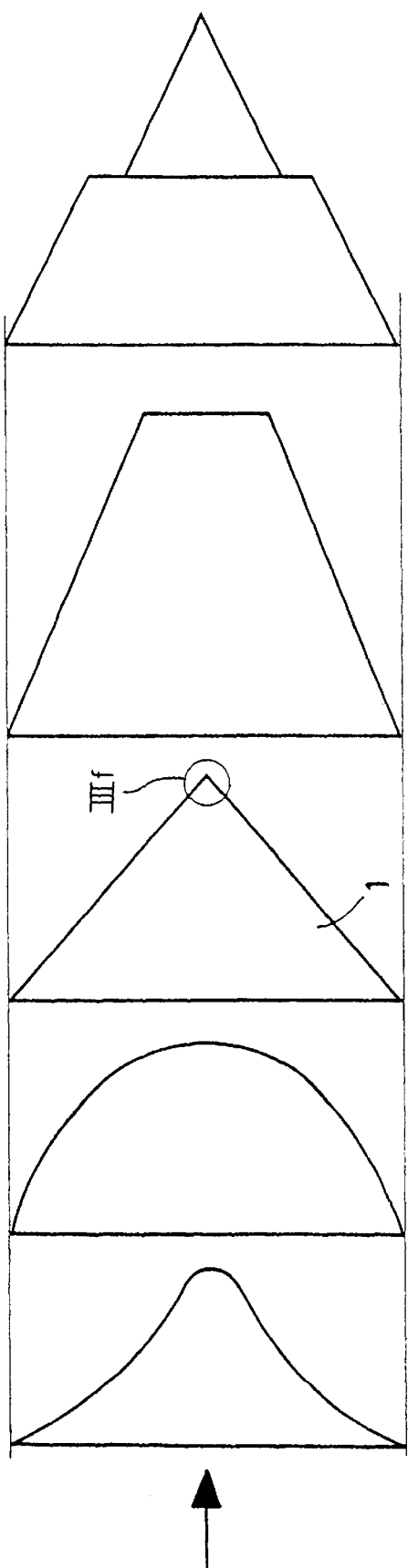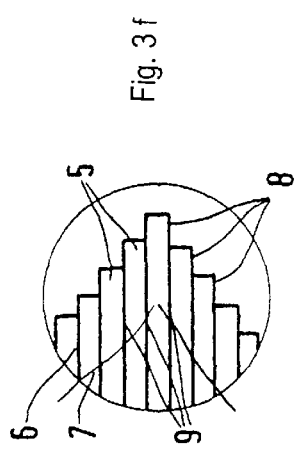

CATALYST CARRIER BODY WITH EXPOSED HEAT-RADIATING SURFACES

CROSS-REFERENCE TO RELATED APPLICATION

This application is a continuation of copending International Application No. PCT/EP98/07048, filed Nov. 4, 1998, which designated the United States.

BACKGROUND OF THE INVENTION

Field of the Invention

The invention relates to a catalyst carrier body for an exhaust system of an internal combustion engine, in particular of a vehicle, including a matrix having an inflow surface, an outflow surface and a multiplicity of catalytic surfaces which form flow-through passages and around which exhaust gas can flow.

The known catalyst carrier bodies are generally wound or wrapped into cylindrical bodies or are laid or stacked so as to form bodies which have different shapes. The actual honeycomb-like matrix structure is formed as a result of substantially smooth sheet-metal layers and wavy sheet-metal layers or wires or wire meshes being wound, wrapped or stacked alternately on top of one another. The substantially cylindrical bodies which are formed when the sheet-metal layers are wrapped or wound over one another have a multiplicity of through-flow passages. A substance which realizes a catalytic reaction is applied to inner surface of the passages. The catalytic reaction proceeds exothermically, so that energy which is released in individual passages is transmitted to adjoining passages. Consequently, the passages which are situated in the interior of the matrix body are heated to a greater extent than the passages located immediately at the periphery or at an exit side, from which heat is radiated to the environment or to the exhaust system in which the catalyst carrier body is embedded.

European Patent 0 121 175 B1 describes a catalyst carrier body which is composed of sheet-metal strips that are wound helically in the shape of a cone. A ratio of a width of the sheet-metal strips to a pitch of a helix or a diameter of the matrix of the catalyst carrier body is selected in such a way that no cross section through the winding intersects all of the layers of sheet-metal strips. That means that the axial extent of the hollow conical carrier body being formed in that way is greater than twice the width of the sheet-metal strips. The matrix which has been formed in that way is fitted in the catalytic converter in such a way that the gas flows in through an outside point of the conical matrix body. The matrix body which is constructed in that way has a high flexibility in terms of its freedom to expand. A drawback is that the energy which is released as a result of the exothermic reaction that takes place in the matrix body remains in the individual layers of the catalyst carrier body for a long time. That is because each section of a layer, on the side remote from the flow, emits the energy substantially in its entirety to an adjacent layer. Therefore, the matrix body is locally exposed to relatively high temperatures, which ultimately may lead to at least local overheating of the carrier body or bed.

SUMMARY OF THE INVENTION

It is accordingly an object of the invention to provide a catalyst carrier body with exposed heat-radiating surfaces, which overcomes the hereinafore-mentioned disadvantages of the heretofore-known devices of this general type and which exhibits an improved heat dissipation behavior from individual layers of a matrix.

With the foregoing and other objects in view there is provided, in accordance with the invention, a catalyst carrier body for an exhaust system of an internal combustion engine, in particular of a vehicle, comprising a matrix having an inflow surface, an outflow surface with an inner region, a periphery, and a multiplicity of catalytic surfaces around which exhaust gas can flow, the catalytic surfaces having front regions and the catalytic surfaces forming flow-through passages with a given length; the outflow surface having a shape, at least in the inner region, causing the front regions to be exposed and not covered outwardly, toward the periphery, by others of the catalytic surfaces; and the exposed front regions having lengths, at least in a partial region of the outflow surface, amounting to from 55% to 90% of the given length, for increasing an outward dissipation of heat.

According to the invention, the catalyst carrier body, which is intended for an exhaust system of an internal combustion engine, in particular of a vehicle, includes a matrix which has layers of an at least partially structured thin material. These layers are wound, wrapped or stacked to form an assembly, so that the interior of the matrix contains a multiplicity of catalytic surfaces around which exhaust gas can flow. The matrix, which is preferably disposed in a casing, has an inflow surface and an outflow surface, as is seen in the direction of flow. According to the invention, at least in the inner region of its outflow surface, the matrix has a projecting shape which is formed as a result of end regions of individual catalytic surfaces being offset with respect to one another. Consequently, at least in its inner region, the matrix has exposed exit-side front regions of the catalytic surfaces. Those front regions are not covered on the outside toward the periphery of the catalyst carrier body, by other catalytic surfaces. According to the invention, these exposed front regions of the catalytic surfaces face toward the periphery of the catalyst carrier body, i.e. they are directed outward. In this context, "directed outward" is understood to mean a direction from an imaginary axis of the catalyst carrier body running in the direction of flow toward the outer periphery or, if present, the casing. In order to improve the dissipation of heat, front regions which are as large as possible are advantageous at least in the inner region of the outflow surface.

A significant advantage of a matrix constructed in this way is that, over the outwardly-facing exposed front regions of the catalytic surfaces, the energy which is released as a result of the exothermic reaction inside the catalyst carrier body is emitted directly to the environment, i.e. to areas of the exhaust system which do not form part of the catalyst carrier body. This prevents the energy which is absorbed by the catalytic surfaces as a result of the exothermic reaction from being transmitted entirely to adjoining catalytic surfaces. The proportion of energy which is not transmitted to adjacent catalytic surfaces, i.e. the proportion of energy which is dissipated directly to the environment, becomes greater the more the front regions of the catalytic surfaces of adjacent layers are offset with respect to one another, i.e. the larger the exposed front regions of the catalytic surfaces are made.

In accordance with another feature of the invention, the matrix is wound, wrapped or stacked in honeycomb form from at least partially structured thin sheet-metal layers, so that a multiplicity of passages through which exhaust gas can flow are formed, and the walls of the passages are the catalytic surfaces.

In accordance with a further feature of the invention, the projecting shape of the outflow surface has a concave curvature running substantially from the periphery of the matrix toward the axis, i.e. inward, at least in sections, so that a finger-like projection is formed in a central region in the area of the axis of the catalyst carrier body. The advantage of a projecting shape configured in this way is that the extent to which the front regions of the passage walls are offset with respect to one another increases the closer they are to the axis of the catalyst carrier body. This is because these walls are exposed to the greatest amount of energy uptake due to the catalytic reaction proceeding in the catalyst carrier body, and they consequently ensure improved dissipation of heat in conjunction with larger front regions.

In accordance with an added feature of the invention, the projecting shape is formed by a convex curvature running inward substantially from the periphery of the matrix toward the axis of the catalyst carrier body, at least in sections.

This convex curvature, if it is provided substantially continuously, results in a domed bulge in the outflow surface of the catalyst carrier body.

In accordance with an additional feature of the invention, the projecting shape is constructed as part of a paraboloid, a hemisphere or an ellipsoid.

In accordance with yet another feature of the invention, the projecting shape of the outflow surface is formed by convex and concave curved sections. The curvature of the outflow surface, which changes from the periphery of the catalyst carrier body toward the inside, in the direction of the axis, is preferably configured in such a way that increased amounts of heat can be released at locations of the catalyst carrier body at which local temperature peaks arise as a result of the exothermic reaction. This is because in these regions with local temperature peaks, the front regions of the passage walls are more significantly offset with respect to one another than in other regions.

In accordance with yet a further feature of the invention, the projecting shape of the outflow surface is constructed conically or frustoconically, at least in sections. However, it is also possible for the outflow surface to be assembled from a plurality of different conical and/or frustoconical sections.

In accordance with yet an added feature of the invention, the honeycomb-like matrix of the catalyst carrier body is extended telescopically, so that the inflow surface is constructed substantially congruently with respect to the projecting shape of the outflow surface. This means that there are exposed front regions of the passage walls on the entry side. Those regions are not covered toward the periphery of the catalyst carrier body by other passage walls and face toward the interior of the catalyst carrier body, i.e. toward the axis.

As mentioned above, the exposed front regions of the passage walls, at least in a partial region of the outflow surface, specifically according to the extent of telescopic extension, have a size or length of from 55% to 90% of the length of the passages. This means that, on one hand, more than half of the length of the passages is provided with exposed side walls and that consequently sufficiently large heat-emitting surfaces of the matrix, which are directed outward toward the periphery of the catalyst carrier body, are present. The telescopic extension, in particular of the inner region of the matrix, is therefore selected to be as great as possible. The extent to which the adjacent passage walls overlap one another is selected in such a way that the matrix itself has sufficient strength and appropriate expandability when subjected to thermal loads.

In accordance with a concomitant feature of the invention, the inner region of the outflow surface amounts to from 5% to 35%. In this context, "inner region" is to be understood as meaning that region of the matrix which is disposed in the area of the axis of flow through the matrix. In particular, that region of the individual passages which has undergone telescopic extension and is disposed in the region of the axis of flow through the catalyst carrier body is exposed to the highest thermal loads and consequently, according to this preferred exemplary embodiment, requires the largest heat-dissipating area, i.e. the largest exposed front regions of the passage walls.

Preferably, the individual layers from which the honeycomb-like matrix of the catalyst carrier body is formed are not connected to one another. As a result, it is possible to carry out a telescopic extension which corresponds to the installation conditions of a novel catalytic converter of this type. These catalytic converters are also known as Billig catalytic converters or B catalytic converters.

A method for producing a catalyst carrier body as described above includes winding, wrapping or stacking a matrix in honeycomb form having a multiplicity of passages through which exhaust gas can flow, from at least partially structured layers of thin material, which form the walls of these passages, in order to form an assembly with an outflow surface which has a projecting shape. This is done in such a way that exposed front regions of the passage walls are formed, at least in its inner region. The front regions are not covered on the outside, toward the periphery of the catalyst carrier body, by other passage walls. As a result, the dissipation of heat outward toward the periphery of the catalyst carrier body is increased. By way of example, such a catalyst carrier body according to the invention can be produced by providing the individual layers with a varying width, so that, for example, in the case of winding, a honeycomb-like matrix is produced which has, for example, a substantially planar inflow surface. However, on the exit side, the front regions of the individual passage walls are offset with respect to one another in such a way that the front regions of the passages disposed in the inner, i.e. central, region of the honeycomb-like matrix project furthest out from an imaginary exit plane.

According to another aspect of the method for producing a catalyst carrier body, a matrix in honeycomb form having a multiplicity of passages through which exhaust gas can flow is wound, wrapped or stacked from at least partially structured layers of thin material, which form the passage walls, in order to form an assembly having substantially parallel inflow and outflow surfaces. The matrix then undergoes telescopic extension, so that an outflow surface with a projecting shape is formed. Exposed front regions of the passage walls are formed, at least in an inner region of that shape. Those regions are not covered on the outside, toward the periphery of the catalyst carrier body, by other passage walls. As a result, the dissipation of heat outward toward the periphery of the catalyst carrier body is increased. In this context, "telescopic extension" is understood to mean that the individual layers from which the honeycomb-like matrix is formed are displaced with respect to one another in the direction of flow. This is done in such a way that the passage walls disposed in the central region of the matrix are preferably pushed further out from an imaginary exit plane of the matrix than corresponding passage walls disposed closer to the periphery of the matrix body.

According to an exemplary embodiment, the layers are brazed at their contact points or contact surfaces either after winding or after telescopic extension. However, the brazing step may also be dispensed with, particularly in the case of B catalytic converters.

Other features which are considered as characteristic for the invention are set forth in the appended claims.

Although the invention is illustrated and described herein as embodied in a catalyst carrier body with exposed heat-radiating surfaces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3a–3e are side-elevational views of exemplary embodiments of a structure of a projecting shape on an outflow surface of a matrix of a catalyst carrier body according to the invention; and FIG. 3f is an enlarged, fragmentary, side-elevational view of a portion IIIf of the projecting shape of FIG. 3c.

DESCRIPTION OF THE PREFERRED EMBODIMENTS

Figure 1:
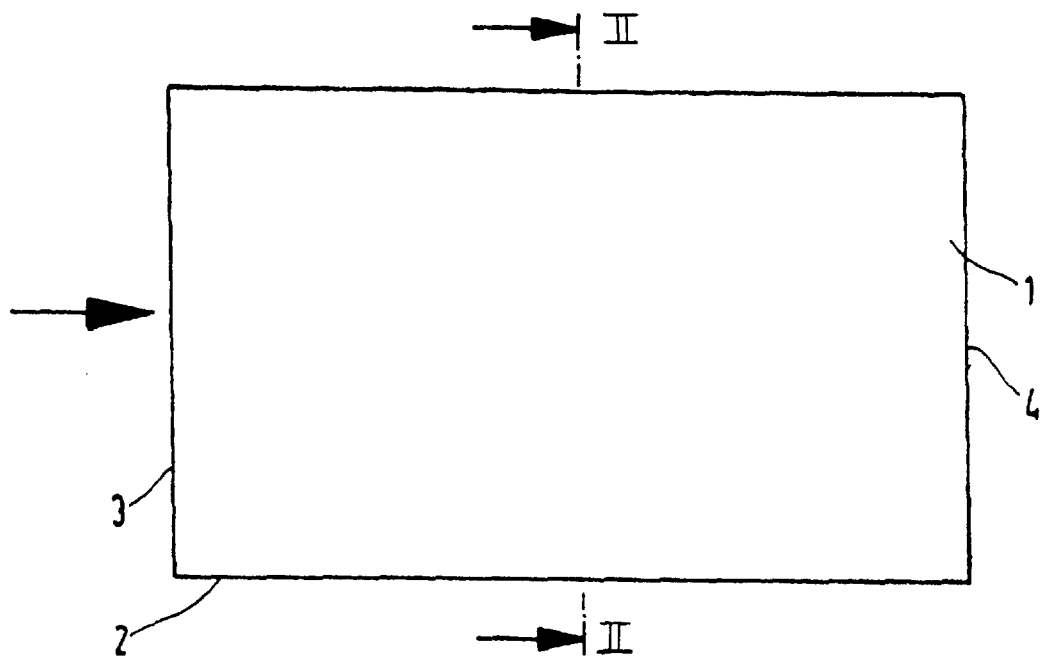
FIG. 1 is a diagrammatic, side-elevational view of a catalyst carrier body according to the prior art, which has a cylindrical structure.

Referring now to the figures of the drawings in detail and first, particularly, to FIG. 1 thereof, there is seen a side-elevational view of a catalyst carrier body or bed in a generally known, substantially cylindrical form. The catalyst carrier body has a honeycomb-like matrix 1 with an inflow surface 3 for entry of an exhaust-gas flow to be catalytically cleaned as indicated by an arrow, an outflow surface 4 and a periphery 2. A casing which surrounds the actual honeycomb-like matrix 1 is provided at the periphery 2.

Figure 2:
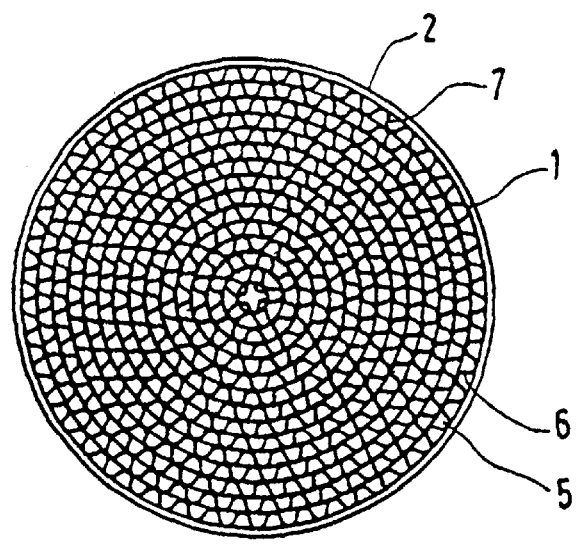
FIG. 2 is a sectional view taken along a line II—II of FIG. 1, in the direction of the arrows, perpendicular to a direction of flow through the catalyst carrier body.

FIG. 2 shows a cross section taken along a section plane II—II through the catalyst carrier body. The casing 2 surrounds the honeycomb-like matrix, which creates the actual honeycomb structure as a result of substantially smooth sheet-metal layers 6 and corrugated or wavy sheet-metal layers 7 being wound alternately on top of one another. Spaces in the wavy layers 7 form flow-through passages 5. As a result, a multiplicity of the flow-through passages 5 of this nature is formed in the honeycomb-like matrix 1.

FIGS. 3a to 3e show various exemplary embodiments of a structure of a projecting shape of the outflow surface 4 of the matrix 1 of the catalyst carrier body. An arrow shown to the left of the exemplary embodiment of FIG. 3a indicates a direction of flow. The projecting shape shown in the exemplary embodiment of FIG. 3a has a continuous concave curvature running inward from the periphery of the matrix 1 toward a longitudinal axis of the catalyst carrier body. The continuous concave curvature forms a finger-like projection in the region of the longitudinal axis of the catalyst carrier body. Individual passage walls or catalytic surfaces 9 shown in FIG. 3f are offset on the exit side to a greater extent with respect to one another in a central region around the longitudinal axis of the catalyst carrier body than at a peripheral region, i.e. in a region of the periphery 2 of the matrix 1. Consequently, the curvature of the outflow surface 4 constitutes a measure representing the extent to which adjacent passage walls 9 of the matrix 1 are offset. The greater this offset is, the larger exposed front regions 8 of the passage walls 9 facing toward the periphery of the catalyst carrier body become. The flow-through passages 5 are formed by a multiplicity of the individual passage walls or catalytic surfaces 9 around which exhaust gas can flow.

In the exemplary embodiment of FIG. 3b, the outer contour of the projecting shape of the outflow surface 4 of the matrix 1 of the catalyst carrier body is formed by a continuously convex curvature. As a result, an outflow surface 4 which has a dome-like structure is produced. At that surface, the outward-facing front regions 8 of the passage walls 9 increase in size the closer the corresponding passages 5 lie to the periphery of the matrix 1.

The exemplary embodiments of FIGS. 3c, 3d and 3e show projecting shapes of the outflow surface 4 of the matrix 1 which are respectively conical (exemplary embodiment of FIGS. 3c), frustoconical (exemplary embodiment of FIG. 3d) and composed of a frustoconical section and a conical piece (exemplary embodiment of FIG. 3e). In each of the exemplary embodiments of FIGS. 3c, 3d and 3e, significant parts of the outflow surface 4 are constructed as a projecting shape in which outwardly facing exposed front regions 8 of the passage walls 9 are formed.

A partial enlargement of the tip region of the cone shape of the outflow surface 4 of the exemplary embodiment of FIG. 3c, is illustrated in FIG. 3f. That partial enlargement makes it clear that the individual sheet-metal layers are wound in such a way, or shifted with respect to one another in such a way, that in each case one complete layer, which is formed from a substantially straight sheet-metal layer 6 and a wavy sheet-metal layer 7 and through the use of which the passages 5 having the corresponding passage walls 9 are formed, has exposed front regions 8 that face outward, i.e. toward the periphery of the matrix 1. These exposed front regions enable an improved dissipation of heat from the matrix 1 to be achieved without the heat being transmitted from the individual passage walls 9 to directly adjacent passage walls 9. Accordingly, the outflow surface 4 has a shape, at least in an inner region, causing the front regions 8 to be exposed and not covered outwardly, toward the periphery 2, by others of the catalytic surfaces 9. The exposed front regions 8 have lengths, at least in a partial region of the outflow surface 4, amounting to from 55% to 90% of the length of the passages 5, for increasing the outward dissipation of heat.

The exemplary embodiments of FIGS. 3a, 3b, 3c, 3d and 3e merely represent examples. The projecting shape may also be composed of a plurality of conical and/or frusto-conical sections. It is also possible for the projecting shape to be composed of conical, frustoconical and curved shapes. Preferably, the individual layers from which the honeycomb-like matrix 1 is assembled are not brazed together. As a result, the catalyst carrier body which has been wound substantially into a cylindrical shape can be extended telescopically into any desired form of outflow surface 4.

However, it is also possible for the sheet-metal layers 6, 7 which are to be wound into the matrix 1 to have a varying width, so that the desired projecting shape of the outflow surface 4 is produced in accordance with the variation in the width of the sheet-metal layers 6, 7. Contact points or contact surfaces of the individual layers may be soldered to one another, depending on the particular application.

We claim:

1. A catalyst carrier body for an exhaust system of an internal combustion engine, comprising:
a matrix having an inflow surface, an outflow surface with an inner region, a periphery, and a multiplicity of catalytic surfaces around which exhaust gas can flow, the catalytic surfaces having front regions and the catalytic surfaces forming flow-through passages; and
the outflow surface having a non-flat shape causing, at least in the inner region, the front regions of the catalytic surfaces to be exposed outwardly toward the periphery without being covered by at least some of the catalytic surfaces, for increasing an outward dissipation of heat.

2. The catalyst carrier body according to claim 1, wherein the matrix is wound, wrapped or stacked in honeycomb form from at least partially structured layers of thin material, the layers have the catalytic surfaces forming a multiplicity of the passages through which exhaust gas can flow, and the catalytic surfaces are passage walls of the passages.

3. The catalyst carrier body according to claim 2, wherein the matrix has an interior, the shape of the outflow surface projects, the inflow surface is substantially congruent with the projecting shape of the outflow surface, and the passages have passage walls and exposed entry-side front regions, the entry-side front regions facing toward the interior and not covered by at least some of the passage walls toward the periphery.

4. The catalyst carrier body according to claim 1, wherein the matrix has a central region, and the shape of the outflow surface projects and is formed by a concave curvature running inward substantially from the periphery, at least in sections, with a substantially finger-shaped projection in the central region.

5. The catalyst carrier body according to claim 4, wherein the projecting shape is formed by convex and concave curved sections.

6. The catalyst carrier body according to claim 1, wherein the shape of the outflow surface projects and is formed by a convex curvature running inward substantially from the periphery, at least in sections.

7. The catalyst carrier body according to claim 6, wherein the projecting shape is part of one of a paraboloid, a hemisphere and an ellipsoid.

8. The catalyst carrier body according to claim 6, wherein the projecting shape is formed by convex and concave curved sections.

9. The catalyst carrier body according to claim 1, wherein the shape of the outflow surface projects, and the projecting shape is part of one of conical and frustoconical, at least in sections.

10. The catalyst carrier body according to claim 1, wherein the inner region of the outflow surface amounts to from 5% to 35% of the outflow surface.

11. The catalyst carrier body according to claim 1, wherein the catalytic surfaces with exposed front regions have a given length, and the exposed regions of the catalytic surfaces have lengths from 55% to 90% of the given length.

12. In an exhaust system of an internal combustion engine having a catalyst carrier body with a matrix, the matrix comprising:
an inflow surface, an outflow surface with an inner region, a periphery, and a multiplicity of catalytic surfaces around which exhaust gas can flow, the catalytic surfaces having front regions and the catalytic surfaces forming flow-through passages; and
the outflow surface having a non-flat shape causing, at least in the inner region, the front regions of the catalytic surfaces to be exposed outwardly toward the periphery without being covered by at least some of the catalytic surfaces, for increasing an outward dissipation of heat.

13. The matrix according to claim 12, wherein the matrix is wound, wrapped or stacked in honeycomb form from at least partially structured layers of thin material, the layers have the catalytic surfaces forming a multiplicity of the passages through which exhaust gas can flow, and the catalytic surfaces are passage walls of the passages.

14. The matrix according to claim 13, further comprising an interior, and wherein the shape of the outflow surface projects, the inflow surface is substantially congruent with the projecting shape of the outflow surface, and the passages have passage walls and exposed entry-side front regions, the entry-side front regions facing toward the interior and not covered by at least some of the passage walls toward the periphery.

15. The matrix according to claim 12, further comprising a central region, and wherein the shape of the outflow surface projects and is formed by a concave curvature running inward substantially from the periphery, at least in sections, with a substantially finger-shaped projection in the central region.

16. The matrix according to claim 15, wherein the projecting shape is formed by convex and concave curved sections.

17. The matrix according to claim 12, wherein the shape of the outflow surface projects and is formed by a convex curvature running inward substantially from the periphery, at least in sections.

18. The matrix according to claim 17, wherein the projecting shape is part of one of a paraboloid, a hemisphere and an ellipsoid.

19. The catalyst carrier body according to claim 17, wherein the projecting shape is formed by convex and concave curved sections.

20. The matrix according to claim 12, wherein the shape of the outflow surface projects, and the projecting shape is part of one of conical and frustoconical, at least in sections.

21. The matrix according to claim 12, wherein the inner region of the outflow surface amounts to from 5% to 35% of the outflow surface.

22. The matrix according to claim 12, wherein the catalytic surfaces with exposed front regions have a given length, and the exposed regions of the catalytic surfaces have lengths from 55% to 90% of the given length.

* * * * *